(12) United States Patent
Tsujikawa

(10) Patent No.: US 11,945,380 B2
(45) Date of Patent: Apr. 2, 2024

(54) STRUCTURE FOR ATTACHING WIRE HARNESS AT VEHICLE DOOR AND METHOD OF ATTACHING WIRE HARNESS AT VEHICLE DOOR

(71) Applicant: TOYOTA JIDOSHA KABUSHIKI KAISHA, Toyota (JP)

(72) Inventor: Yohichi Tsujikawa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/059,472

(22) Filed: Nov. 29, 2022

(65) Prior Publication Data

US 2023/0219508 A1 Jul. 13, 2023

(30) Foreign Application Priority Data

Jan. 12, 2022 (JP) ................................ 2022-003319

(51) Int. Cl.
*B60R 16/02* (2006.01)
*H02G 3/32* (2006.01)

(52) U.S. Cl.
CPC ........... *B60R 16/0215* (2013.01); *H02G 3/32* (2013.01)

(58) Field of Classification Search
CPC .. B60R 16/0207; B60R 16/0215; H02G 3/30; H02G 3/32
See application file for complete search history.

(56) References Cited

U.S. PATENT DOCUMENTS

| 4,918,261 A | * | 4/1990 | Takahashi | F16L 3/23 |
| | | | | 174/72 A |
| 2010/0279538 A1 | * | 11/2010 | Sakata | B60R 16/02 |
| | | | | 439/387 |
| 2020/0290531 A1 | * | 9/2020 | Iwahara | B60R 16/0215 |
| 2021/0031709 A1 | * | 2/2021 | Kato | H02G 3/30 |
| 2021/0163075 A1 | * | 6/2021 | Iwahashi | B60K 37/00 |

FOREIGN PATENT DOCUMENTS

| JP | 2009-051457 A | 3/2009 |
| JP | 2018012389 A | 1/2018 |
| JP | 2020096526 A | 6/2020 |

* cited by examiner

*Primary Examiner* — Paresh Paghadal
(74) *Attorney, Agent, or Firm* — Dickinson Wright, PLLC

(57) ABSTRACT

A structure for attaching a wire harness at a vehicle door includes: a slit formed in a door panel of the vehicle door; an introduction hole provided in the door panel so as to be connected to one end portion of the slit; a tube that covers a peripheral surface of the wire harness; and an elastically deformable clip that is fixed to the tube, wherein the clip includes a first contact portion that is configured to move via the introduction hole from a side of one surface of the door panel to a side of another surface of the door panel and contact the another surface, an insertion portion that is slidably inserted into the slit when the first contact portion contacts the another surface, a second contact portion that contacts the one surface of the door panel when the insertion portion is inserted into the slit.

10 Claims, 11 Drawing Sheets

US 11,945,380 B2

STRUCTURE FOR ATTACHING WIRE HARNESS AT VEHICLE DOOR AND METHOD OF ATTACHING WIRE HARNESS AT VEHICLE DOOR

CROSS-REFERENCE TO RELATED APPLICATION

This application is based on and claims priority under 35 USC 119 from Japanese Patent Application No. 2022-003319 filed on Jan. 12, 2022, the disclosure of which is incorporated by reference herein.

BACKGROUND

Technical Field

The present disclosure relates to a structure for attaching a wire harness at a vehicle door and a method of attaching a wire harness at a vehicle door.

Related Art

Japanese Patent Application Laid-open (JP-A) No. 2009-51457 discloses a structure for attaching a wire harness at a vehicle door. In JP-A No. 2009-51457, a hole is formed a reinforcement provided in a door outer panel of the vehicle door, and a fixing clamp is fixed in the hole. The wire harness can be fixed in the fixing clamp.

The structure for attaching a wire harness at a vehicle door of JP-A No. 2009-51457 has room for improvement in relation to workability when attaching the wire harness to the door panel in such a way that the wire harness does not rattle.

In view of the above circumstances, it is an object of the present disclosure to obtain a structure for attaching a wire harness at a vehicle door and a method of attaching a wire harness at a vehicle door by which a worker can easily attach a wire harness to a door panel in such a way that the wire harness does not rattle.

SUMMARY

A structure for attaching a wire harness at a vehicle door pertaining to a first aspect of the disclosure includes: a slit that is formed in a door panel of a vehicle door and extends along a predetermined direction; an introduction hole that is provided in the door panel so as to be connected to one end portion of the slit in a direction of extension of the slit; a wire harness; a tube that covers a peripheral surface of the wire harness; and a clip that is fixed to the tube and is elastically deformable, wherein the clip includes a first contact portion that is configured to move via the introduction hole from a side of one surface of the door panel to a side of another surface of the door panel and is configured to contact the another surface of the door panel, an insertion portion that is slidably inserted into the slit from the one end portion when the first contact portion contacts the another surface of the door panel, and a second contact portion that contacts the one surface of the door panel when the insertion portion has been inserted into the slit, and a distance, in a thickness direction of the door panel, between the first contact portion and the second contact portion when the clip is in a free state is smaller than a thickness of the door panel.

In the structure for attaching a wire harness at a vehicle door pertaining to the first aspect of the disclosure, the first contact portion of the clip can be moved via the introduction hole from a side of one surface of the door panel to a side of another surface of the door panel and is configured to contact the another surface of the door panel. Moreover, when the first contact portion contacts the another surface of the door panel, the insertion portion of the clip can be slidably inserted into the slit from the one end portion. Moreover, by inserting the insertion portion into the slit, the second contact portion of the clip contacts the one surface of the door panel. Moreover, the distance, in a thickness direction of the door panel, between the first contact portion and the second contact portion that was smaller than the thickness of the door panel when the clip was in a free state becomes the same as the thickness of the door panel at this time. For that reason, the clip elastically deforms. Moreover, the first contact portion and the second contact portion sandwich the door panel utilizing the force produced by the clip as a result of the clip deforming elastically. In this way, in the structure for attaching a wire harness at a vehicle door pertaining to the first aspect, a worker can easily attach the wire harness to the door panel in such a way that the wire harness does not rattle.

A structure for attaching a wire harness at a vehicle door pertaining to a second aspect of the disclosure is the first aspect, wherein linear portions formed in the second contact portions make line contact with the one surface of the door panel.

In the second aspect, the linear portion formed in the second contact portion makes line contact with the one surface of the door panel. For that reason, the resistance produced between the second contact portion and the door panel when the second contact portion moves relative to the door panel becomes smaller. Consequently, it is easy to adjust the position of the clip relative to the door panel in the predetermined direction.

A structure for attaching a wire harness at a vehicle door pertaining to a third aspect of the disclosure is the first aspect, wherein the clip includes a pair of third contact portions that elastically deform and contact a pair of inner surfaces in a width direction of the slit when the insertion portion has been inserted into the slit.

In the third aspect, the pair of third contact portions of the clip elastically deform and contact the pair of width direction inner surfaces of the slit when the insertion portion has been inserted into the slit. For that reason, the clip does not rattle relative to the door panel in the width direction of the slit.

A structure for attaching a wire harness at a vehicle door pertaining to a fourth aspect of the disclosure is the third aspect, wherein the dimension of the third contact portions in the width direction gradually becomes larger from a side of another end portion of the slit to a side of the one end portion.

In the fourth aspect, it becomes easy to insert the insertion portion and the third contact portions into the slit.

A structure for attaching a wire harness at a vehicle door of a fifth aspect of the disclosure is the first aspect, wherein the door panel includes a movement regulating portion that opposes the introduction hole from the side of the another surface of the door panel, a guide surface, which opposes an inner peripheral surface of the introduction hole in the predetermined direction when the first contact portion contacts a surface of the movement regulating portion that opposes the introduction hole, is formed in the first contact portion, and when the guide surface contacts the inner peripheral surface while moving in a direction from the side of the one end portion of the slit toward the side of the another end portion, the guide surface guides the first contact portion to a position at which the first contact portion opposes the another surface of the door panel.

In the fifth aspect, when the first contact portion of the clip has been moved via the introduction hole from the one surface side to the another surface side of the door panel, the first contact portion contacts the movement regulating portion. Moreover, at this time the guide surface of the first contact portion of the clip opposes the inner peripheral surface of the introduction hole in the predetermined direction. For that reason, when the clip is moved from this state in the direction from the one end portion side of the slit toward the another end portion side, the guide surface contacts the inner peripheral surface of the introduction hole and guides the first contact portion to the position in which the first contact portion opposes the another surface of the door panel. For that reason, the first contact portion is smoothly moved to the position in which it opposes the another surface of the door panel.

A structure for attaching a wire harness at a vehicle door pertaining to a sixth aspect of the disclosure is the fifth aspect, wherein the movement regulating portion includes a stopper surface that opposes the first contact portion in a direction parallel to the predetermined direction when the insertion portion has been inserted into the slit.

In the sixth aspect, when the insertion portion has been inserted into the slit, the first contact portion of the clip opposes the stopper surface of the movement regulating portion in a direction parallel to the predetermined direction. Consequently, when force in the direction in which the clip is moved toward the movement regulating portion acts on the clip, the first contact portion contacts the stopper surface. For that reason, when force in the direction in which the clip is moved toward the movement regulating portion acts on the clip, the clip is unlikely to drop out of the slit and the introduction hole.

A structure for attaching a wire harness at a vehicle door pertaining to a seventh aspect of the disclosure is the first aspect, wherein the slit slopes relative to a horizontal direction in such a way that the another end portion of the slit is positioned lower than the one end portion of the slit.

In the seventh aspect, there is little concern that the insertion portion will suddenly move toward the one end portion side of the slit after the insertion portion has been inserted into the slit. For that reason, the clip is unlikely to suddenly drop out of the slit and the introduction hole.

A structure for attaching a wire harness at a vehicle door pertaining to an eighth aspect of the disclosure is the first aspect, wherein a tapered surface, which is connected to the one end portion of the slit and whose dimension in a width direction of the slit gradually becomes smaller toward the one end portion side, is formed at an inner peripheral surface of the introduction hole.

In the eighth aspect, it becomes easy to insert the insertion portion of the clip into the slit from the one end portion of the slit.

A structure for attaching a wire harness at a vehicle door pertaining to a ninth aspect of the disclosure is the first aspect, further including a fixing member that fixes the tube to the door panel when the first contact portion has contacted the another surface of the door panel and the second contact portions have contacted the one surface of the door panel.

In the ninth aspect, the tube can be fixed to the door panel by the fixing member. For that reason, the clip is unlikely to suddenly drop out of the slit and the introduction hole.

A method of attaching a wire harness at a vehicle door, the method comprising using an elastically deformable clip fixed to a tube that covers a peripheral surface of the wire harness to attach the wire harness to a door panel of the vehicle door, wherein: a slit that extends along a predetermined direction and an introduction hole that is connected to one end portion of the slit in a direction of extension of the slit are formed in the door panel, the clip includes a first contact portion, an insertion portion, and a second contact portion, and a distance, in a thickness direction of the door panel, between the first contact portion and the second contact portion when the clip is in a free state is smaller than a thickness of the door panel, the first contact portion is moved via the introduction hole from a side of one surface to a side of another surface of the door panel and brought into contact with the another surface of the door panel, when the first contact portion contacts the another surface of the door panel, the insertion portion is slidably inserted into the slit from the one end portion, and the second contact portion is brought into contact with the one surface of the door panel by inserting the insertion portion into the slit.

As described above, the structure for attaching a wire harness at a vehicle door and the method of attaching a wire harness at a vehicle door pertaining to the present disclosure have the excellent effect that a worker can easily attach the wire harness to a door panel in such a way that the wire harness does not rattle.

BRIEF DESCRIPTION OF THE DRAWINGS

An exemplary embodiment of the present disclosure will be described in detail based on the following figures, wherein.

DETAILED DESCRIPTION

Figure 1:
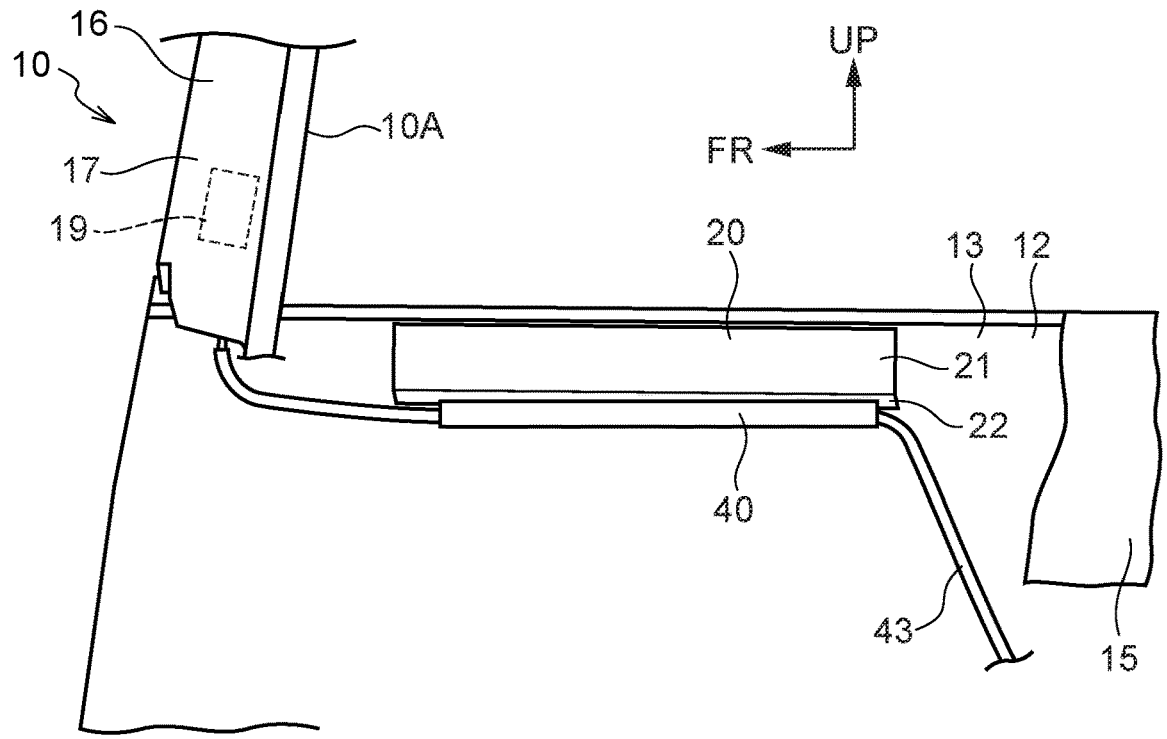
FIG. 1 is a side view, seen from a vehicle inner side, of a door outer panel and a door sash of a vehicle door to which a wire harness attachment structure pertaining to the embodiment has been applied.
Figure 2:
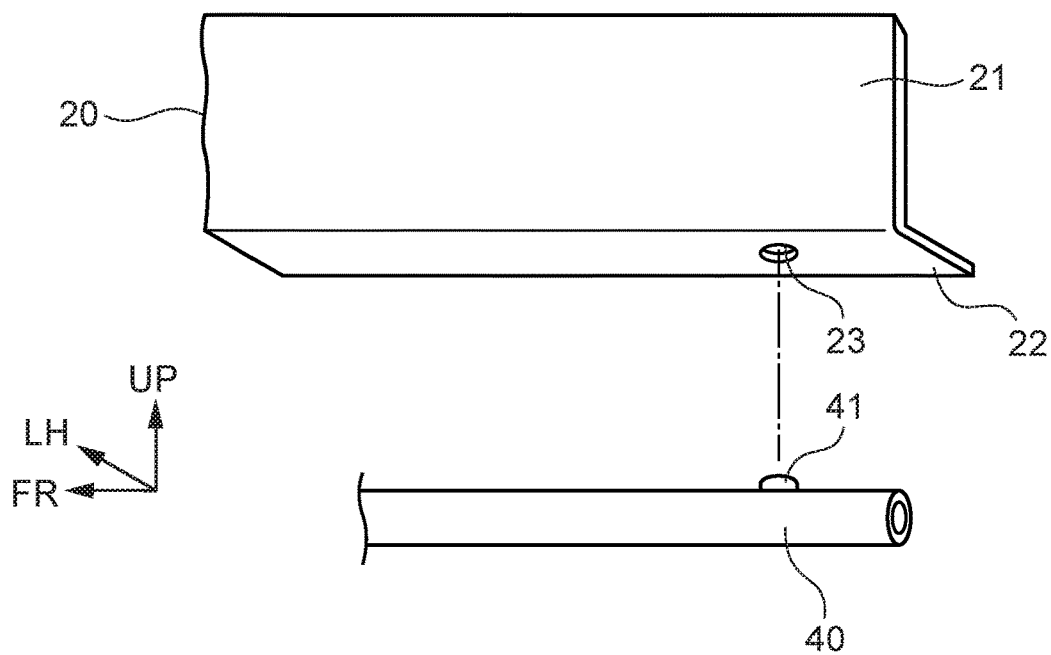
FIG. 2 is a perspective view of a reinforcement and a tube of the vehicle door shown in FIG. 1.

An embodiment of a structure for attaching a wire harness at a vehicle door and a method of attaching a wire harness at a vehicle door pertaining to the present disclosure will be described below with reference to the drawings. It will be noted that arrow UP in the drawings indicates an upward direction in the vehicle up and down direction, arrow FR indicates a forward direction in the vehicle front and rear direction, and arrow LH indicates a leftward direction in the vehicle right and left direction (vehicle width direction). "Up and down direction," "front and rear direction," and "right and left direction" in the following description will mean the vehicle up and down direction, the vehicle front and rear direction, and the vehicle right and left direction, respectively.

Figure 4:
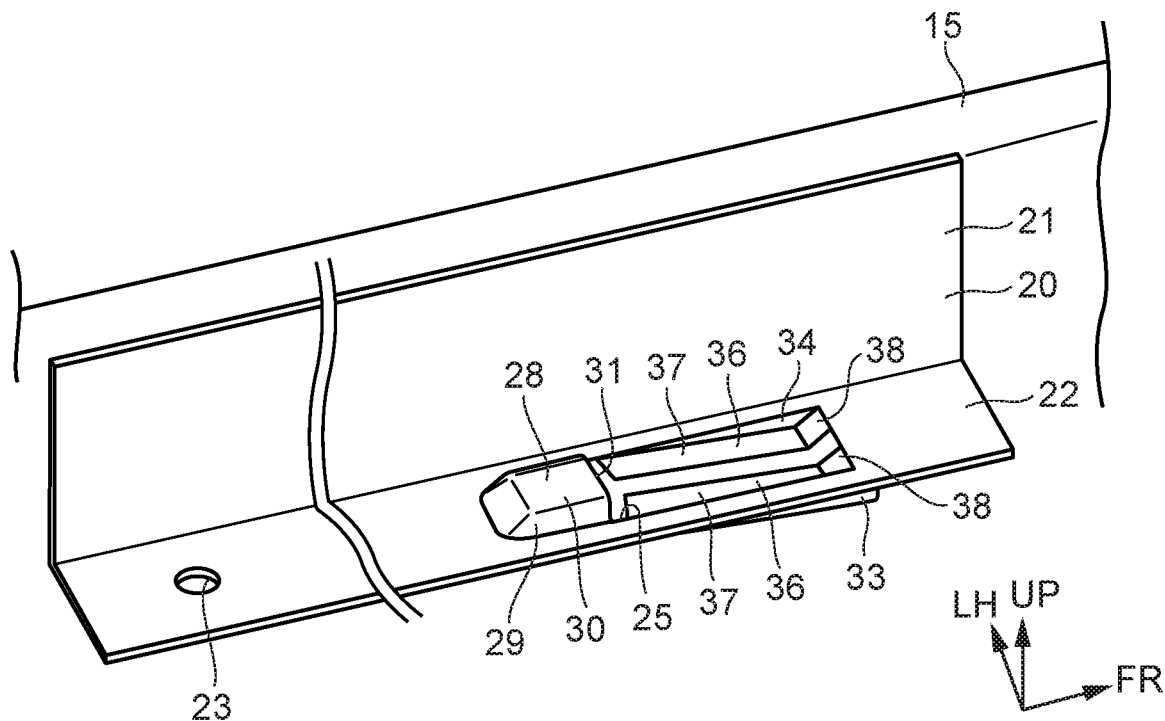
FIG. 4 is a perspective view of the reinforcement and a door inner panel seen from the vehicle outer side.

An open portion formed in a right side surface of a vehicle of the present embodiment is provided with a rear door (vehicle door) 10 shown in FIG. 1. The rear door 10 includes a door outer panel (door panel) 12 made of metal that configures the lower half of the outer surface of the rear door 10, a door inner panel (door panel) 15 made of metal that opposes the vehicle inner surface of the door outer panel 12, and a door frame 16 that configures the upper half of the rear door 10. The door outer panel 12 includes a panel body 13 and a later-described reinforcement 20. A window hole 10A is formed between the door outer panel 12 and the door frame 16. Moreover, the peripheral edge portion—excluding the upper edge portion—of the vehicle outer surface of the door inner panel 15 shown in FIG. 4 is fixed to the peripheral edge portion—excluding the upper edge portion—of the vehicle inner surface of the door outer panel 12. A space is formed between the door outer panel 12 and the door inner panel 15. Moreover, a service hole (not shown in the drawings) that runs through the door inner panel 15 in its thickness direction is formed in the up and down direction middle portion of the door inner panel 15.

The front end portion of the door frame 16 made of metal is configured by a side sash 17 that extends substantially in the up and down direction. The lower end portion of the vehicle outer surface of the side sash 17 is welded to the upper portion of the vehicle inner surface of the door outer panel 12. An electronic device 19 can be attached to the vehicle outer surface of the side sash 17. The electronic device 19 is, for example, an antenna device that receives radio waves transmitted by a smart key (not shown in the drawings). It will be noted that a pillar garnish made of resin (not shown in the drawings) that covers the electronic device 19 from the vehicle outer side is attached to the vehicle outer surface of the side sash 17.

As shown in FIG. 1, the reinforcement 20 made of metal is fixed to the upper edge portion of the vehicle inner surface of the panel body 13. The reinforcement 20 includes a first plate portion 21 that is a flat plate and a second plate portion 22 that is a flat plate. The first plate portion 21 is orthogonal to the right and left direction. The second plate portion 22 is orthogonal to the first plate portion 21, and the vehicle inner edge portion of the second plate portion 22 is connected to the lower edge portion of the first plate portion 21. A circular hole 23 is formed in the vicinity of the rear end of the second plate portion 22.

Figure 3:
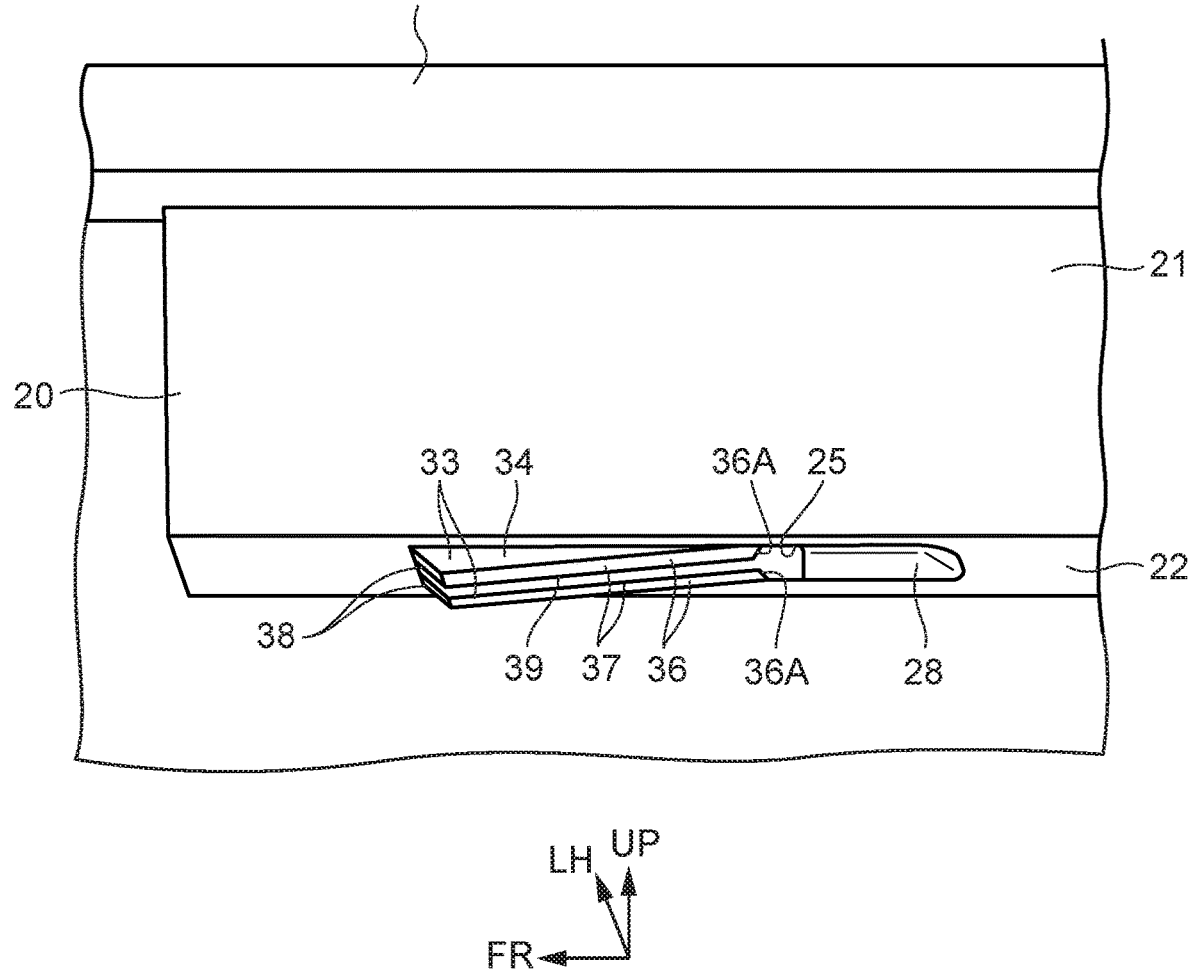
FIG. 3 is a perspective view of the reinforcement seen from the vehicle inner side.
Figure 5:
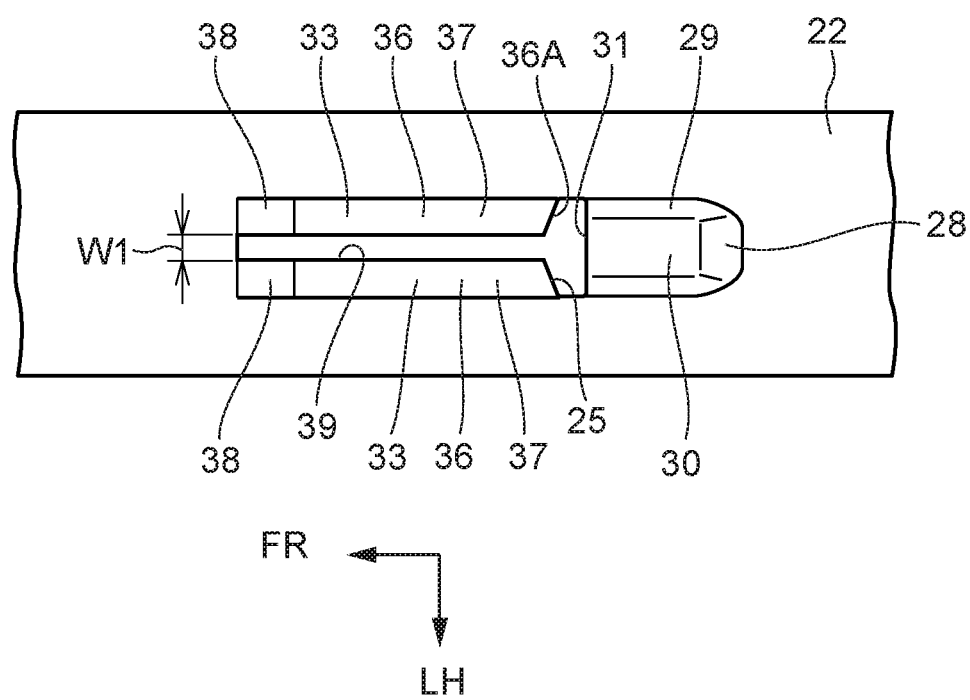
FIG. 5 is a plan view of a second plate portion of the reinforcement.
Figure 6:
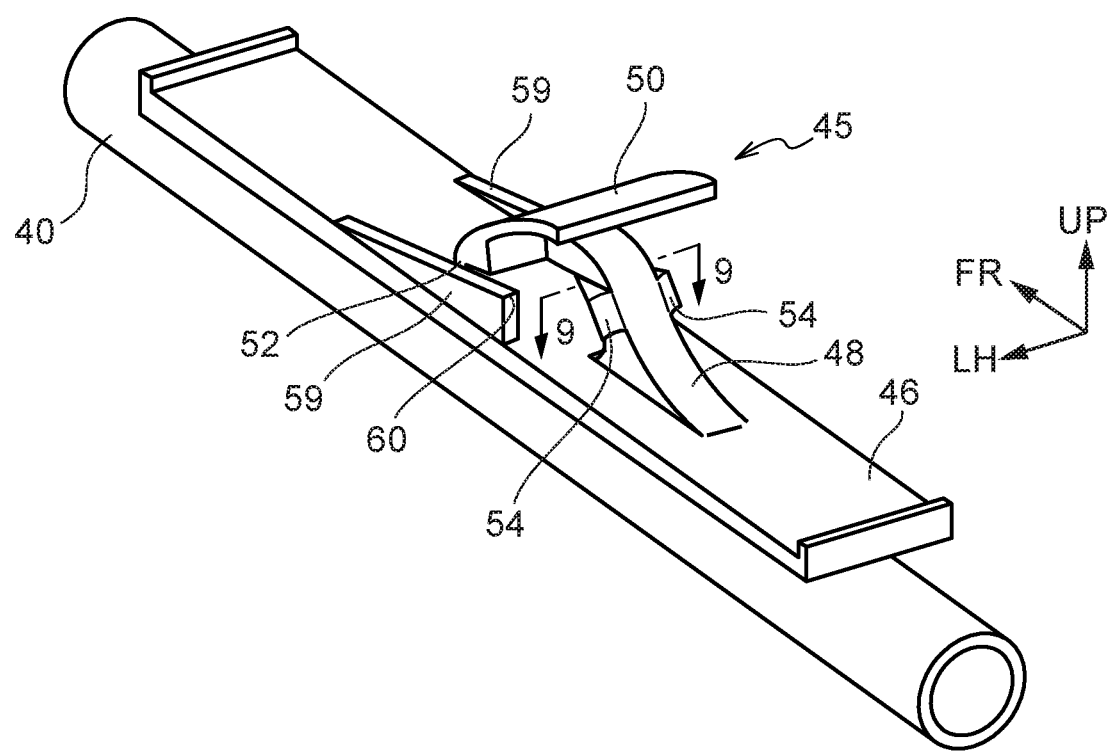
FIG. 6 is a perspective view of the tube and a clip seen from above.

As shown in FIG. 3 to FIG. 5, an introduction hole 25 positioned in front of the circular hole 23 is formed in the second plate portion 22. A movement regulating portion 28 is also formed in the second plate portion 22 by cutting-and-raising. The movement regulating portion 28 includes a peripheral edge portion 29, which extends upward from both right and left edge portions of the introduction hole 25 and is substantially U-shaped when seen in plan view, and a restraining portion 30, which is connected to the upper edge portion of the peripheral edge portion 29. The restraining portion 30 is distanced upward from the upper surface of the second plate portion 22 and opposes the introduction hole 25 in the up and down direction. The front surface of the restraining portion 30 configures a stopper surface 31.

Figure 16:
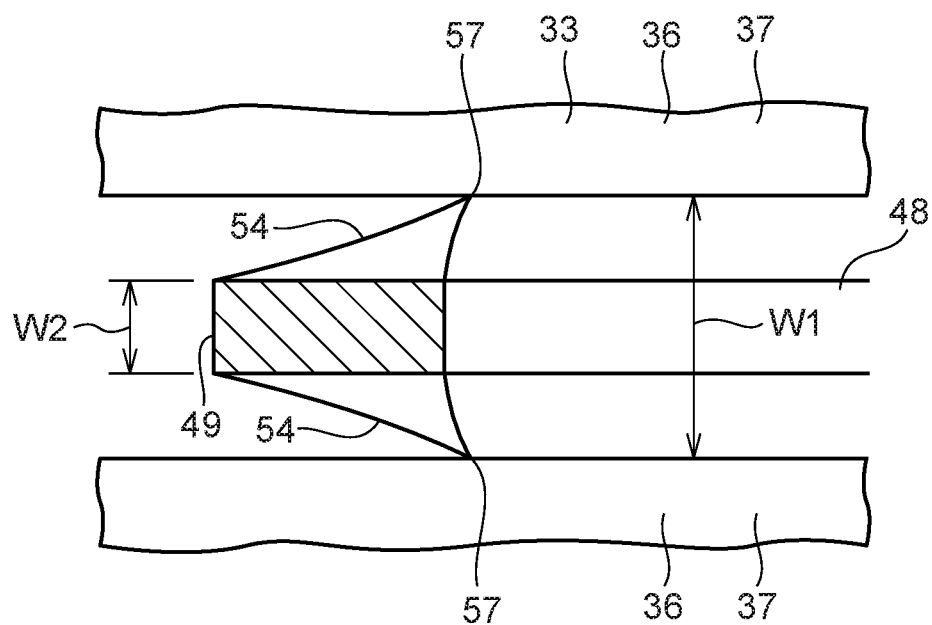
FIG. 16 is a view showing the second plate portion of the reinforcement as well as the insertion portion and third contact portions of the clip.

A right and left pair of clip attaching portions 33 positioned directly in front of the introduction hole 25 are also provided in the second plate portion 22 by cutting-and-raising. Each clip attaching portion 33 includes a side plate portion 34 and a bottom plate portion 36. The side shape of each side plate portion 34 is triangular. Each side plate portion 24 is positioned lower than the introduction hole 25. The outer edge portion of each bottom plate portion 36 is connected to the lower edge portion of each side plate portion 34. Each bottom plate portion 36 includes a support portion 37 and a front end portion 38. When seen in side view, the support portions 37 slope relative to the horizontal direction. That is, each support portion 37 runs downward from back to front. The front end portions 38 extend obliquely forward and upward from the front end portions of the support portions 37. That is, each front end portion 38 runs upward from back to front. Moreover, on the front end portion of the inner peripheral surface of the introduction hole 25, tapered surfaces 36A that gradually run forward from the outer end portions to the inner end portions of the right and left support portions 37 are formed. In other words, the tapered surfaces 36A are formed on the rear end surfaces of the right and left support portions 37. Moreover, a slit 39 that extends in the front and rear direction is formed between the right and left bottom plate portions 36. As shown in FIG. 5 and FIG. 16, the right-left dimension (width) of the slit 39 is W1.

Next, a tube 40, a wire harness 43, and a clip 45 shown in FIG. 1, FIG. 2, and FIG. 6 to FIG. 10 will be described.

The tube 40, which has the shape of an open cylinder, is configured by a hard material. For that reason, unless an extremely large external force is applied to the tube 40, the tube 40 maintains the linear shape shown in the drawings. A projection (fixing member) 41 having the shape of a solid cylinder is fixed to the outer peripheral surface of the tube 40 in the vicinity of the rear end of the tube 40. The projection 41 is configured by an elastic material. Moreover, the outer diameter of the projection 41 when the projection 41 is in a free state is slightly larger than the diameter of the circular hole 23.

The wire harness 43, which is flexible, passes through the inside of the tube 40. Connectors (not shown in the drawings) are provided on both ends of the wire harness 43. One connector is connected to the electronic device 19.

The clip 45 is an integrally molded product configured by an elastic material. The elastic material configuring the clip 45 is, for example, resin. The clip 45 includes a base plate portion 46, an insertion portion 48, a first contact portion 50, third contact portions 54, and second contact portions 59.

Figure 7:
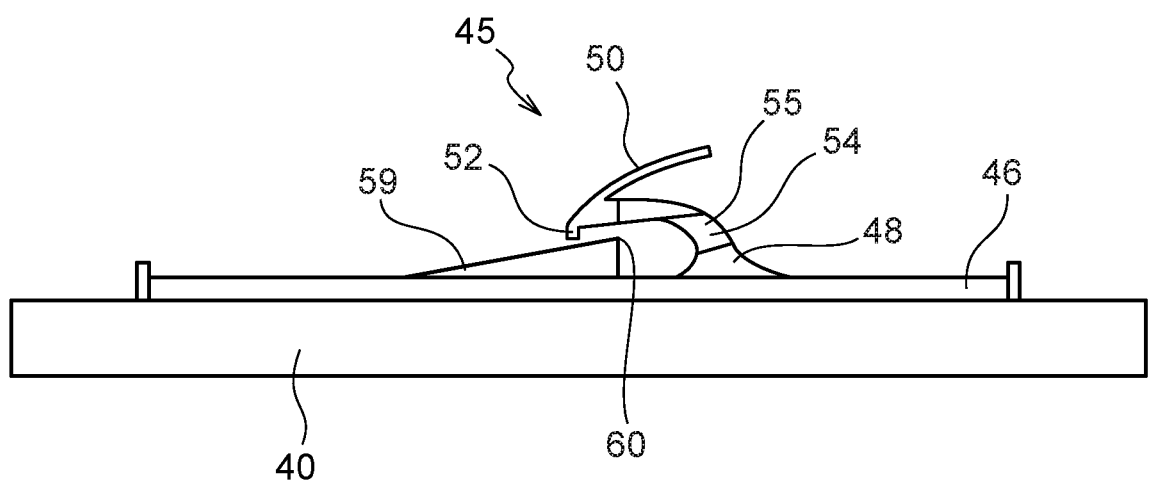
FIG. 7 is a side view of the tube and the clip.
Figure 8:
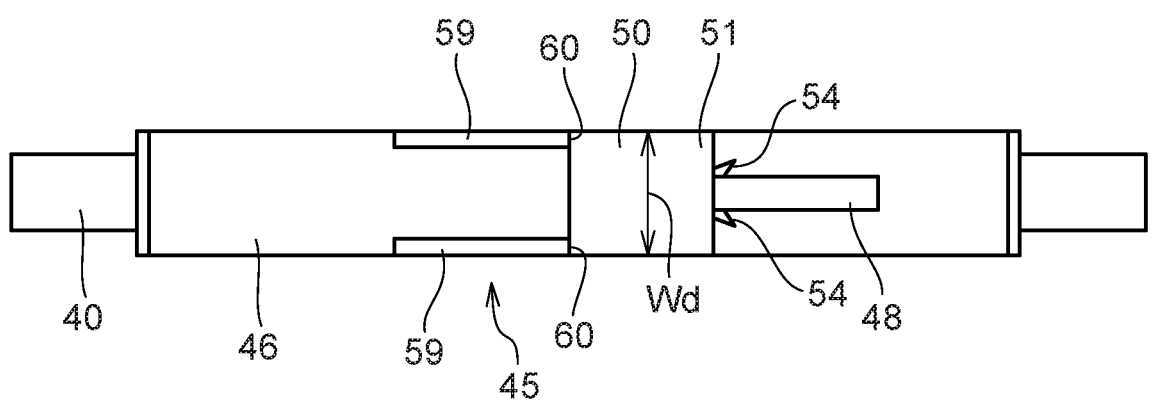
FIG. 8 is a plan view of the tube and the clip.
Figure 10:
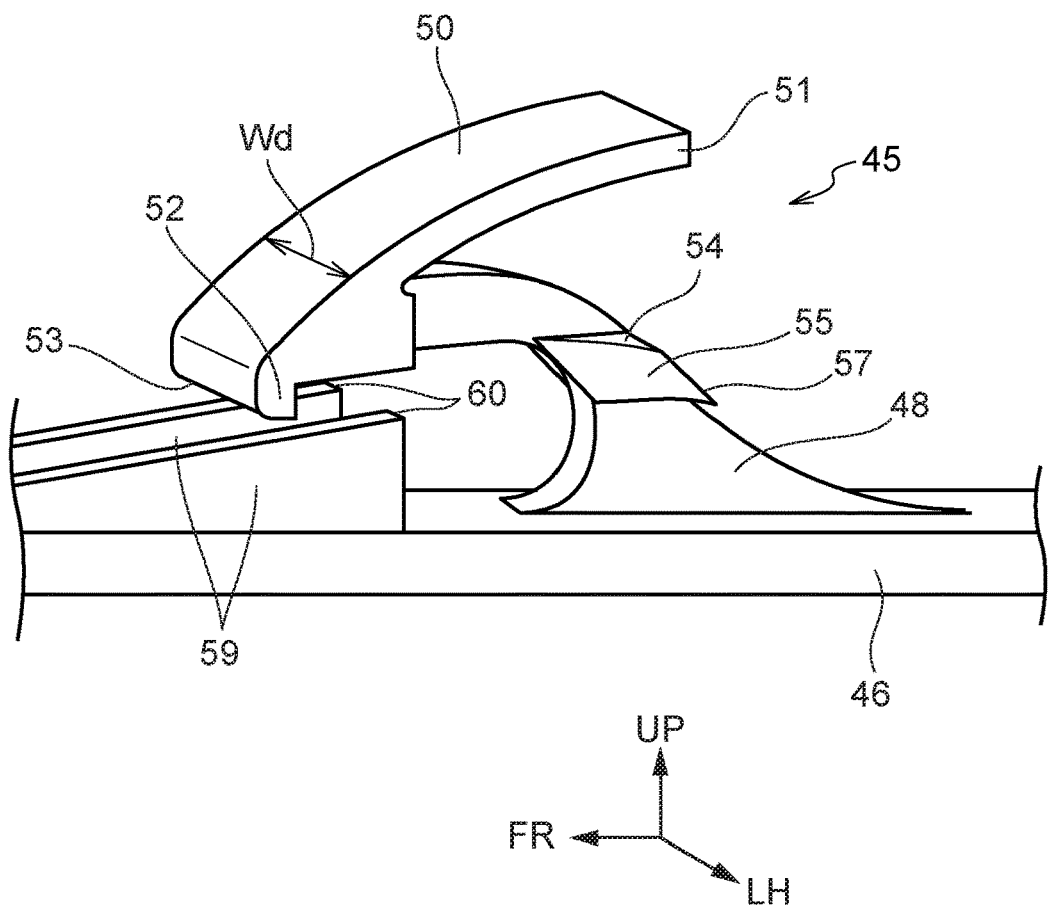
FIG. 10 is a perspective view showing part of the clip.
Figure 11:
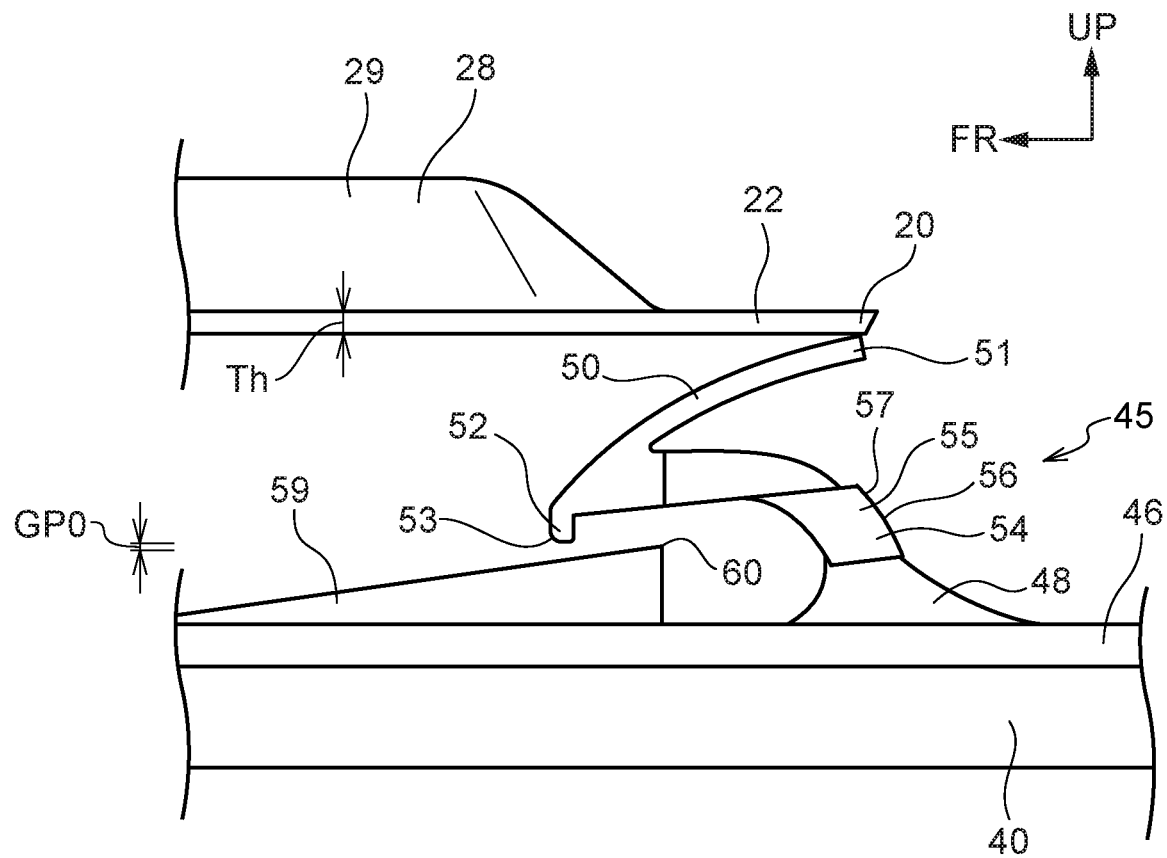
FIG. 11 is a side view of the reinforcement and the clip positioned directly under the reinforcement.
Figure 12:
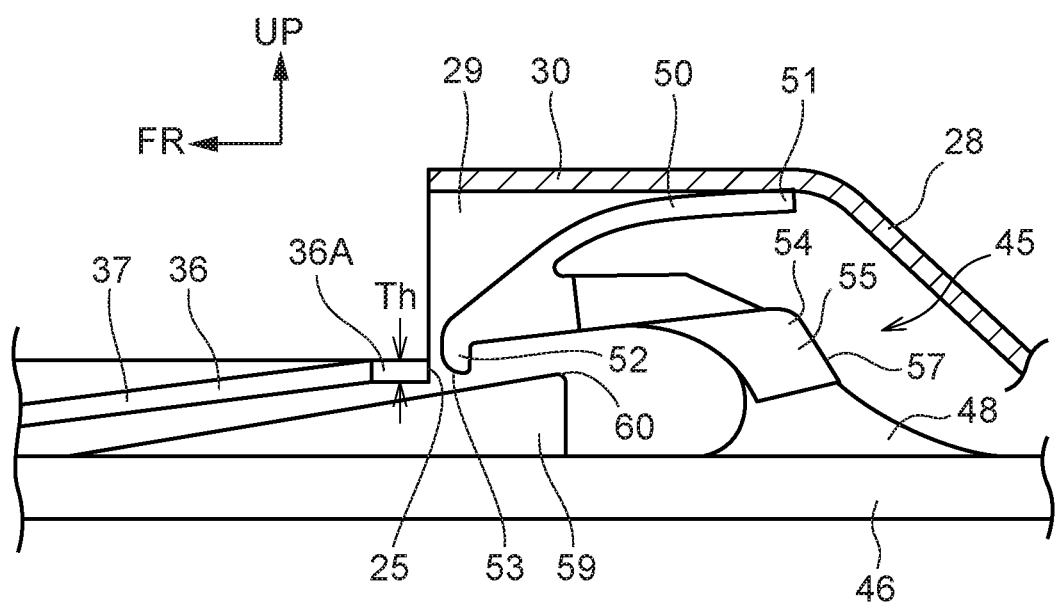
FIG. 12 is a view showing a state in which a first contact portion of the clip is positioned in a space inside a movement regulating portion of the reinforcement.

The base plate portion 46 of the clip 45 is substantially rectangular. The undersurface of the base plate portion 46 is fixed to the outer peripheral surface of the tube 40. The rear end portion (lower end portion) of the insertion portion 48 is connected to the upper surface of the base plate portion 46 in the vicinity of the middle of the upper surface. As shown in FIG. 7, when the clip 45 is in a free state, the side shape of the insertion portion 48 is a curved shape. As shown in FIG. 8, the right-left dimension of the insertion portion 48 is smaller than that of the base plate portion 46. The first contact portion 50 is connected to the front end portion (upper end portion) of the insertion portion 48. As shown in FIG. 8, Wd, which is the right-left dimension of the first contact portion 50, is the same as the right-left dimension of the base plate portion 46. As shown in FIG. 7, when the clip 45 is in a free state, the side shape of the first contact portion 50 is a curved shape. The front end portion of the first contact portion 50 is provided with a protruding ridge portion 52 that projects downward from the front end portion. The right-left dimension of the protruding ridge portion 52 is Wd. The right-left dimension Wd of the protruding ridge portion 52 is greater than the width W1 of the slit 39. As shown in FIG. 10 to FIG. 12, a guide surface 53 that is a rounded surface is formed on the front surface of the lower end portion of the protruding ridge portion 52.

Figure 9:
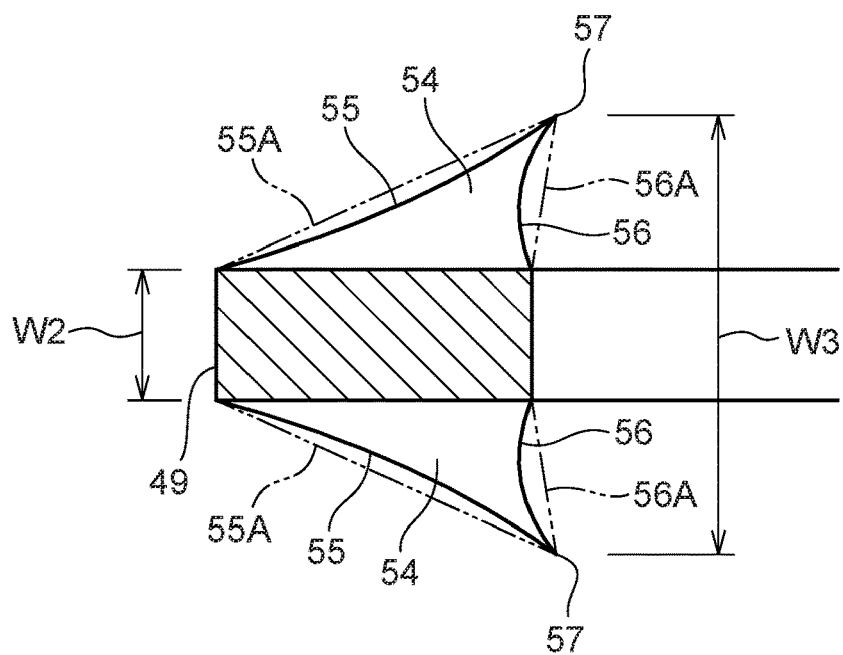
FIG. 9 is a sectional view taken along arrowed line 9-9 of FIG. 6.

The third contact portions 54 are provided on both right and left side surfaces of the insertion portion 48. As shown in FIG. 9, when the clip 45 is in a free state, the planar shapes of the third contact portions 54 are substantially triangular. In other words, the planar shapes of the third contact portions 54 are not perfectly triangular. That is, the planar shapes of outer surfaces 55 of the right and left third contact portions 54 are curved lines positioned inside imaginary straight lines 55A indicated by the long dashed double short dashed lines. That is, the outer surfaces 55 of the right and left third contact portions 54 are curved surfaces inwardly recessed from the imaginary straight lines 55A. Similarly, the planar shapes of rear surfaces 56 of the right and left third contact portions 54 are curved lines positioned inside imaginary straight lines 56A indicated by the long dashed double short dashed lines. That is, the rear surfaces 56 of the right and left third contact portions 54 are curved surfaces inwardly recessed from the imaginary straight lines 56A. Linear portions 57 that extend substantially in the up and down direction are formed in the parts of the third contact portions 54 where the outer surfaces 55 and the rear surfaces 56 meet.

As shown in FIG. 9, the part of the insertion portion 48 where the front ends of the right and left third contact portions 54 are connected is defined as a middle portion 49. The right-left dimension (width) of the middle portion 49 when the clip 45 is in a free state is W2. In other words, the right and left direction distance between the front ends of the right and left third contact portions 54 is W2. Moreover, the right and left direction distance between the linear portions 57 of the right and left third contact portions 54 when the clip 45 is in a free state is W3. That is, the right and left direction distance between the right and left third contact portions 54 gradually becomes smaller from the rear ends to the front ends of the third contact portions 54. Moreover, W1, W2, and W3 have the relationship of W3>W1>W2.

The right and left pair of second contact portions 59 are provided on the upper surface of the base plate portion 46. The side shapes of the right and left second contact portions 59 are right triangular shapes. Linear portions 60 that extend in the right and left direction are formed at corner portions formed between the upper surfaces and the rear surfaces of the second contact portions 59. As shown in FIG. 11, the up and down direction distance (the size of the gap) between the lower end of the protruding ridge portion 52 and the linear portions 60 when the clip 45 is in a free state is defined as GP0. Moreover, the thickness of the second plate portion 22 of the reinforcement 20 is defined as Th. As shown in FIG. 12, the thickness of the bottom plate portions 36 is also Th. In this case, Th>GP0.

Next, a method of attaching an integrated object comprising the wire harness 43 provided with the connectors at both ends, the tube 40, and the clip 45 (hereinafter simply called "the integrated object") to the rear door 10 will be described with reference to FIG. 11 to FIG. 15. It will be assumed that the rear door 10 is in the state in FIG. 1. That is, it will be assumed that a sliding glass is not provided in the rear door 10 and a trim made of resin is not provided on the vehicle inner surface of the door inner panel 15. Moreover, it will be assumed that a pillar garnish is not installed on the vehicle outer surface of the side sash 17.

First, the electronic device 19, which is separate from the side sash 17 and is connected to a connector provided on one end portion of the wire harness 34, is fixed to the vehicle outer surface of the side sash 17. Next, the integrated object is positioned in the bottom portion of the space formed between the door outer panel 12 and the door inner panel 15. Hereinafter, this space will be called a workspace.

Next, a worker (not shown in the drawings) inserts his/her hand from the outside of the door inner panel 15 through the service hole into the workspace and grips the tube 40 of the integrated object with his/her hand. As shown in FIG. 11, the worker then positions the clip 45 above the tube 40. During work described after this, it will be assumed that the worker is unable to see the reinforcement 20 and the clip 45 (the tube 40).

Next, the worker moves the tube 40 and the clip 45 closer to the second plate portion 22 of the reinforcement 20 from below, thereby bringing the first contact portion 50 of the clip 45 into contact with the undersurface of the second plate portion 22 of the reinforcement 20 as shown in FIG. 11. When the first contact portion 50 contacts the undersurface of the second plate portion 22, the insertion portion 48 elastically deforms. For that reason, the worker can recognize, based on the sensation felt by his/her hand, that the first contact portion 50 has contacted the undersurface of the second plate portion 22.

Next, the worker slides the clip 45 in the front and rear direction relative to the second plate portion 22 while maintaining the state of contact between the first contact portion 50 and the second plate portion 22. When the front and rear direction position and the right and left direction position of the first contact portion 50 coincide with the introduction hole 25, the upper portion of the insertion portion 48 and the first contact portion 50 enter the space inside the movement regulating portion 28 as shown in FIG. 12. Moreover, when the first contact portion 50 comes into contact with the undersurface of the restraining portion 30, upward movement of the clip 45 relative to the second plate portion 22 is regulated.

As shown in FIG. 12, at this time the guide surface 53 of the protruding ridge portion 52 opposes the tapered surfaces 36A in the front and rear direction. Moreover, the front portions of the right and left second contact portions 59 are positioned directly under the bottom plate portions 36. For that reason, when the clip 45 is moved forward while keeping the first contact portion 50 in contact with the undersurface of the restraining portion 30, the guide surface 53 of the protruding ridge portion 52 comes into contact with the tapered surfaces 36A and rides over the tapered surfaces 36A in a state in which the front portions of the right and left second contact portions 59 are positioned directly under the bottom plate portions 36.

Figure 13:
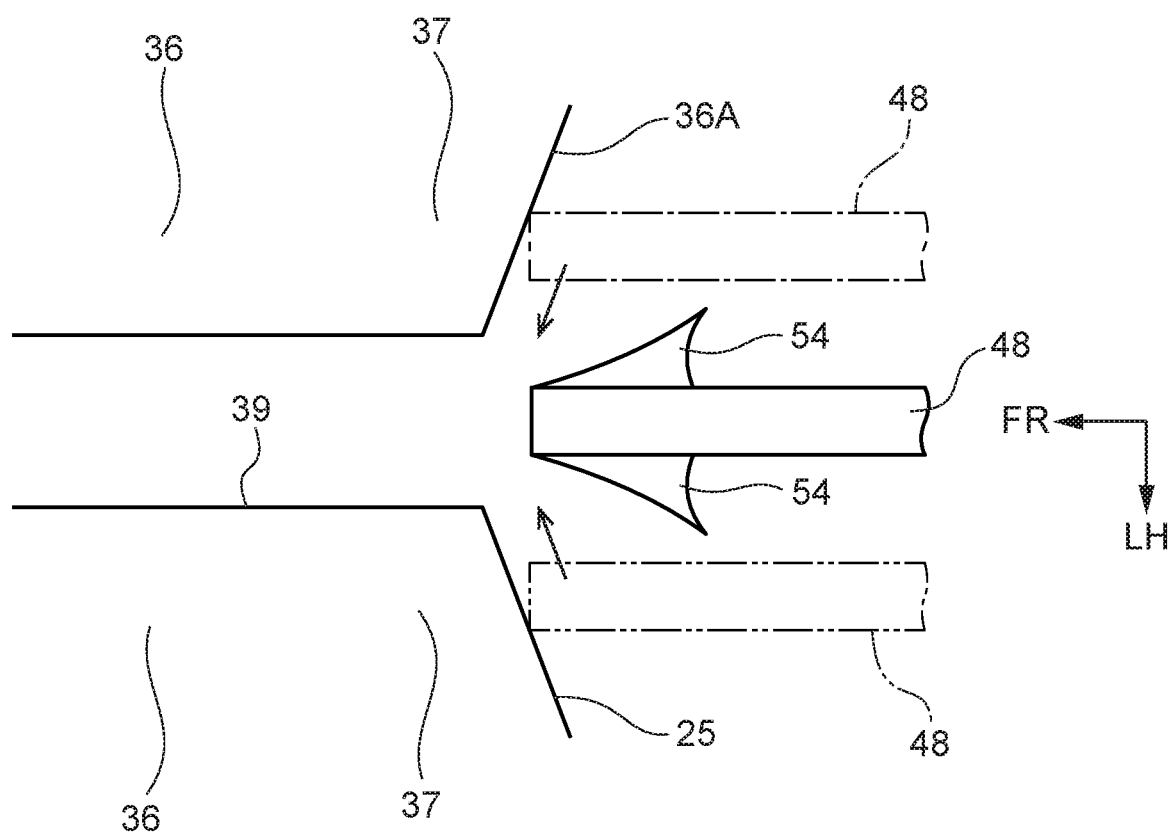
FIG. 13 is a schematic plan view showing a state in which an insertion portion of the clip is positioned directly behind tapered surfaces of the reinforcement.

FIG. 13 shows the positional relationship between the bottom plate portions 36 (the tapered surfaces 36A) and the insertion portion 48 at this time. In a case where the insertion portion 48 is in the position indicated by the solid lines in FIG. 13, when the clip 45 moves forward the middle portion 49 of the insertion portion 48 and the right and left third contact portions 54 advance into the slit 39. As described above, the right-left dimension W2 of the middle portion 49 when the clip 45 is in a free state is smaller than the right-left dimension W1 of the slit 39. For that reason, the middle portion 49 of the insertion portion 48 and the right and left third contact portions 54 can smoothly advance into the slit 39. On the other hand, in a case where the insertion portion 48 is in the position indicated by the long dashed short dashed lines or the long dashed double short dashed lines in FIG. 13, when the clip 45 moves forward the insertion portion 48 comes into contact with the tapered surfaces 36A. Because of this, the insertion portion 48 is guided by the tapered surfaces 36A toward the rear end portion side of the slit 39 (see the arrows in FIG. 13) so that the insertion portion 48 and the right and left third contact portions 54 advance into the slit 39. Consequently, the worker can, despite being unable to see the second plate portion 22 and the clip 45 (the tube 40), insert the insertion portion 48 and the right and left third contact portions 54 into the slit 39 regardless of the position of the right and left direction position of the insertion portion 48 relative to the bottom plate portions 36 (the tapered surfaces 36A).

Figure 14:
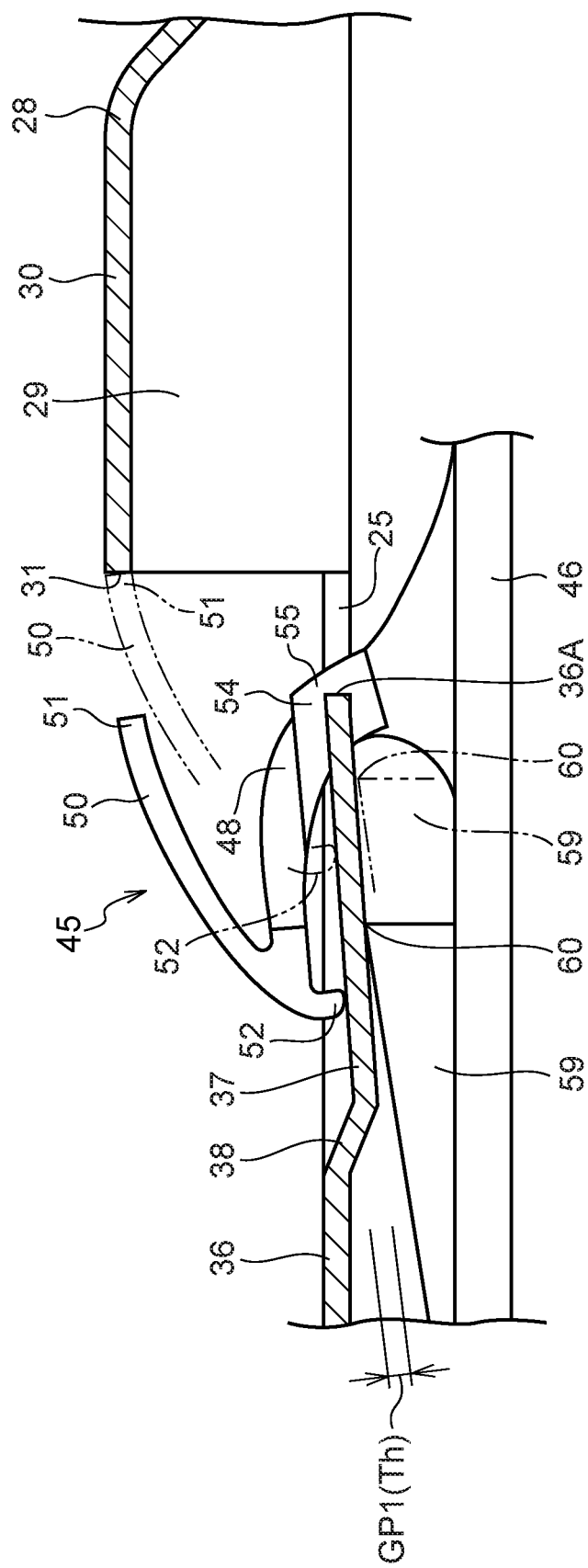
FIG. 14 is a view showing a state when the clip is sandwiching bottom plate portions of the reinforcement.
Figure 15:
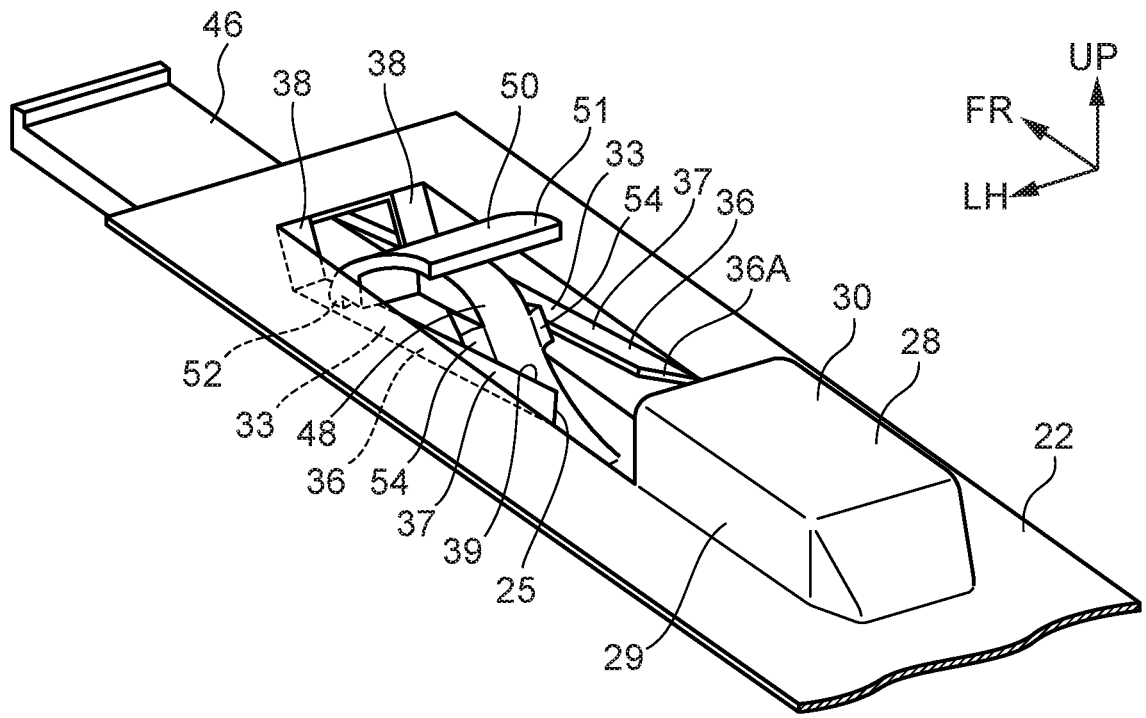
FIG. 15 is a perspective view of the reinforcement and the clip seen from above.

When the insertion portion 48 and the right and left third contact portions 54 advance into the slit 39, the right and left second contact portions 59 become positioned directly under the right and left support portions 37. For that reason, as shown in FIG. 14, the right and left linear portions 60 slidably make line contact with the undersurfaces of the right and left support portions 37. Moreover, the first contact portion 50 emerges forward from the space inside the movement regulating portion 28. GP1, which is the distance, in the thickness direction of the support portions 37, between the lower end of the protruding ridge portion 52 and the linear portions 60 at this time, is substantially the same as the thickness Th of the second plate portion 22 and greater than the distance GP0. That is, at this time the insertion portion 48 elastically deforms. For that reason, biasing force produced by the insertion portion 48 causes the lower end of the protruding ridge portion 52 to pressingly contact the upper surfaces of the support portions 37 as shown in FIG. 14 and FIG. 15 and causes the linear portions 60 of the second contact portions 59 to pressingly contact the undersurfaces of the support portions 37 as shown in FIG. 14. Consequently, the worker can, despite not being able to see the second plate portion 22 and the clip 45 (the tube 40), recognize that the support portions 37 have become sandwiched by the lower end of the protruding ridge portion 52 and the linear portions 60 of the second contact portions 59. Moreover, rattling of the clip 45 relative to the support portions 37 in the thickness direction of the support portions 37 is prevented.

When the protruding ridge portion 52 and the second contact portions 59 are sandwiching the support portions 37 in this way, the clip 45 can slide in the front and rear direction relative to the second plate portion 22. Moreover, the linear portions 60 of the second contact portions 59, and not the entire upper surfaces of the second contact portions 59, make line contact with the undersurfaces of the support portions 37. For that reason, resistance produced between the linear portions 60 and the undersurfaces of the support portions 37 when the clip 45 slides in the front and rear direction relative to the second plate portion 22 becomes smaller than it is in a case where the entire upper surfaces of the second contact portions 59 make plane contact with the undersurfaces of the support portions 37. Moreover, as shown in FIG. 16, when the insertion portion 48 and the right and left third contact portions 54 advance in the slit 39, the right and left third contact portions 54 elastically deforms because the right and left linear portions 57 are pressed by the right and left inner surfaces of the slit 39. For that reason, the right and left direction distance between the linear portions 57 of the right and left third contact portions 54 becomes W1. At this time, the linear portions 57, and not the entire outer surfaces 55 of the right and left third contact portions 54, make line contact with the right and left inner surfaces of the slit 39. Moreover, the outer surfaces 55 and the rear surfaces 56 of the third contact portions 54 are curved surfaces. For that reason, the third contact portions 54 more easily deforms elastically than in a case where the outer surfaces 55 are formed along the imaginary straight lines 55A and the rear surfaces 56 are formed along the imaginary straight lines 56A. For that reason, the resistance produced between the third contact portions 54 and the inner surfaces of the slit 39 when the clip 45 slides in the front and rear direction relative to the second plate portion 22 is small. Consequently, it is easy to adjust the position of the clip 45 relative to the second plate portion 22 in the front and rear direction. It will be noted that when the lower end portion of the protruding ridge portion 52 that has moved forward along the support portions 37 reaches the front end portions of the support portions 37, the lower end portion of the protruding ridge portion 52 collides with the rear end portions of the front end portions 38. For that reason, the worker can, despite not being able to see the second plate portion 22 and the clip 45 (the tube 40), recognize that the lower end portion of the protruding ridge portion 52 has collided with the rear end portions of the front end portions 38. In other words, the worker can recognize the approximate position of the clip 45 in the front and rear direction.

Moreover, at this time, as shown in FIG. 14, a rear end portion 51 of the first contact portion 50 and the stopper surface 31 of the movement regulating portion 28 oppose each other in the front and rear direction. For that reason, if a rearward external force suddenly acts on the clip 45, the clip 45 moves rearward relative to the second plate portion 22, and the rear end portion 51 of the first contact portion 50 contacts the stopper surface 31 of the movement regulating portion 28 as indicated by the imaginary line in FIG. 14. For that reason, the state in which the support portions 37 are sandwiched by the lower end of the protruding ridge portion 52 and the linear portions 60 of the second contact portions 59 is maintained, so the clip 45 is unlikely to suddenly drop out of the slit 39 (the support portions 37) and the introduction hole 25.

Moreover, the support portions 37 slope in such a way that the front end portions of the support portions 37 are positioned lower than the rear end portions thereof. For that reason, when the support portions 37 are being sandwiched by the lower end of the protruding ridge portion 52 and the linear portions 60 of the second contact portions 59, the effect of gravity makes it unlikely that the clip 45 will move toward the rear end portion sides of the support portions 37. For that reason, in this respect also, the clip 45 is unlikely to suddenly drop out of the slit 39 (the support portions 37) and the introduction hole 25.

Moreover, when the insertion portion 48 and the right and left third contact portions 54 advance in the slit 39, the linear portions 57 of the right and left third contact portions 54 contact the right and left inner surfaces of the slit 39, so rattling of the clip 45 relative to the second plate portion 22 in the width direction of the slit 39 is prevented.

When the support portions 37 are sandwiched by the lower end of the protruding ridge portion 52 and the linear portions 60 of the second contact portions 59 and when the insertion portion 48 and the right and left third contact portions 54 are inserted in the slit 39 in this way, the projection 41 fixed to the tube 40 becomes positioned directly under, or in the vicinity of the area directly under, the circular hole 23 of the second plate portion 22. For that reason, when the worker brings the projection 41 into contact with the undersurface of the second plate portion 22 and finely adjusts the position of the tube 40 relative to the second plate portion 22 in the front and rear direction, the projection 41 becomes fitted into the circular hole 23. More specifically, the projection 41 becomes fitted into the circular hole 23 while elastically deforming in such a way that its diameter becomes smaller. That is, the projection 41 becomes press-fitted into the circular hole 23. For that reason, the projection 41 becomes fixed in the circular hole 23 (the second plate portion 22). Consequently, the clip 45 becomes unmovable in the front and rear direction relative to the slit 39 (the second plate portion 22).

As described above, according to the structure for attaching a wire harness at a vehicle door and the method of attaching a wire harness at a vehicle door of the present embodiment, the tube 40 can be easily fixed to the reinforcement 20, which is a part whose visibility is poor in the rear door 10.

A structure for attaching a wire harness at a vehicle door pertaining to the embodiment has been described above, but the structure for attaching a wire harness at a vehicle door can be changed in design as appropriate in a range that does not depart from the spirit of the disclosure.

Figure 17:
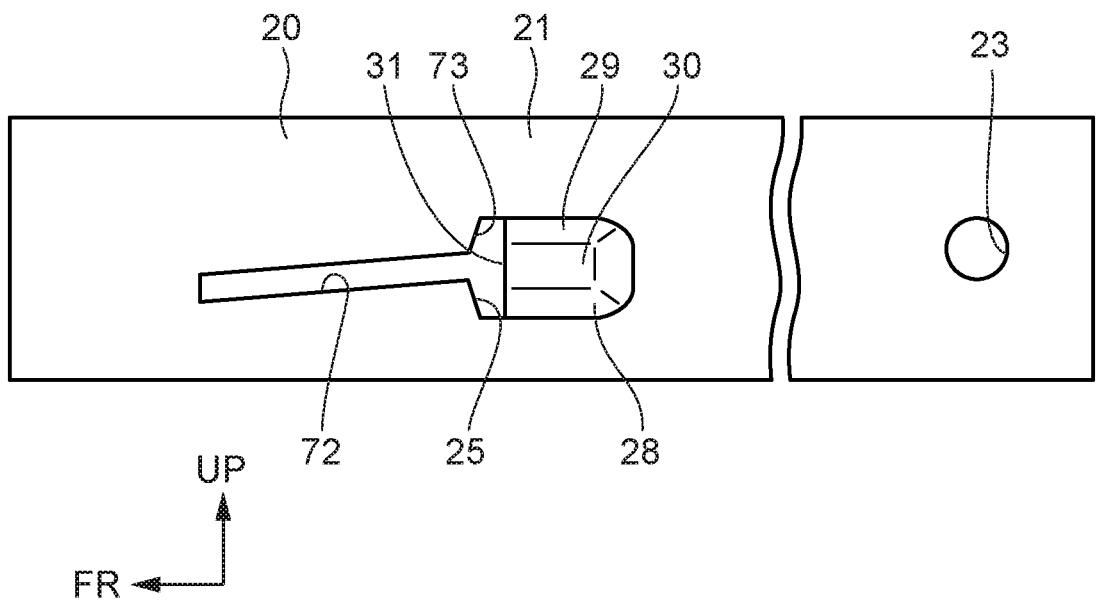
FIG. 17 is a side view of the reinforcement of an example modification.
Figure 18:
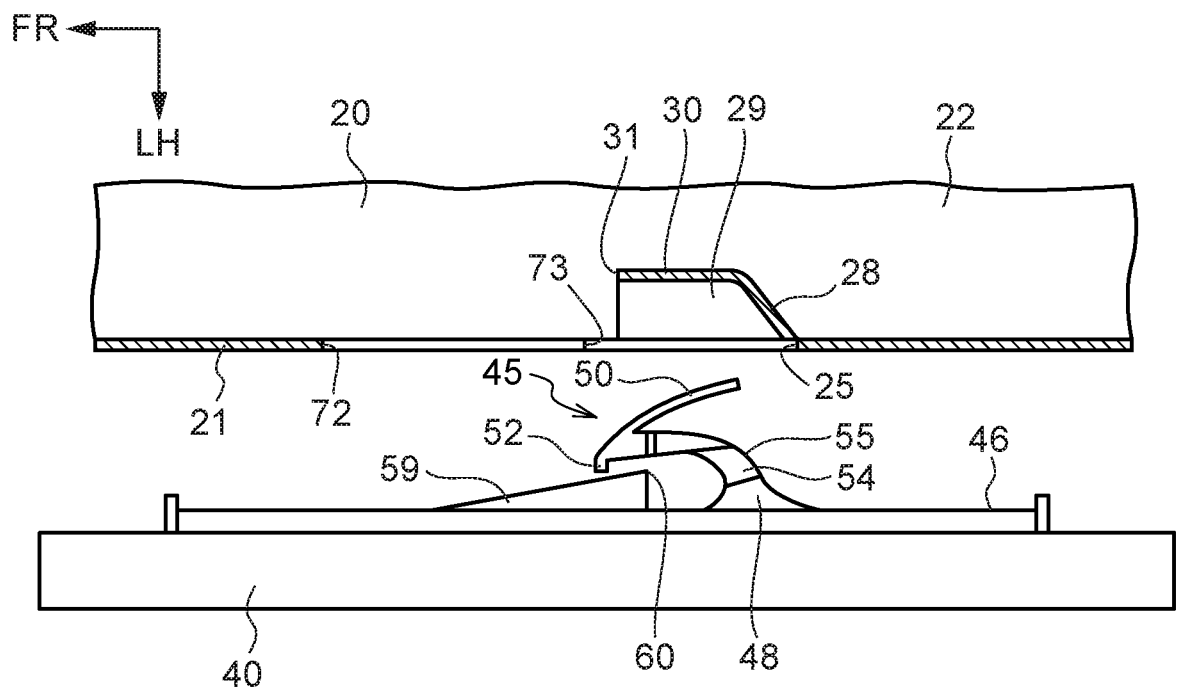
FIG. 18 is a view showing the reinforcement, the clip, and the tube of the example modification.

For example, as shown in FIG. 17 and FIG. 18, the introduction hole 25, the movement regulating portion 28, and a slit 72 may be formed in the first plate portion 21 of the reinforcement 20. This reinforcement 20 does not have parts corresponding to the side plate portions 34 and the bottom plate portions 36. Tapered surfaces 73 are formed in the front end portion of the inner peripheral surface of the introduction hole 25. When seen in side view, the slit 72 is linear in shape. Moreover, the slit 72 slopes relative to the front and rear direction (the horizontal direction) in such a way that the front end portion of the slit 72 is positioned lower than the rear end portion thereof.

The worker grips the tube 40 in the workspace and positions the clip 45 on the right side of the tube 40 as shown in FIG. 18. Then, the worker moves the tube 40 and the clip 45 from the left side closer to the first plate portion 21 of the reinforcement 20, thereby bringing the first contact portion 50 of the clip 45 into contact with the left side surface of the first plate portion 21. When the first contact portion 50 contacts the left side surface of the first plate portion 21, the insertion portion 48 elastically deforms. For that reason, the worker can recognize, based on the sensation felt by his/her hand, that the first contact portion 50 has contacted the first plate portion 21.

Next, the worker slides the clip 45 in the front and rear direction relative to the first plate portion 21 while maintaining the state of contact between the first contact portion 50 and the first plate portion 21. When the front and rear direction position and the up and down direction position of the first contact portion 50 coincide with the introduction hole 25, part of the insertion portion 48 and the first contact portion 50 enter the space inside the movement regulating portion 28 (not shown in the drawings). After this, when the clip 45 is moved forward relative to the reinforcement 20, the clip 45 becomes attached to the first plate portion 21 (the slit 72) in the same way as in the above embodiment. Then, when the worker brings the projection 41 into contact with the first plate portion 21 and finely adjusts the position of the tube 40 relative to the first plate portion 21 in the front and rear direction, the projection 41 becomes fitted into the circular hole 23.

According also to the structure for attaching a wire harness at a vehicle door and the method of attaching a wire harness at a vehicle door pertaining to the example modification shown in FIG. 17 and FIG. 18, the tube 40 can be easily fixed to the reinforcement 20.

Furthermore, the part corresponding to the reinforcement 20 may also be molded integrally with the panel body 13.

Furthermore, the introduction hole 25, the slit 39 (the clip attaching portions 33, the slit 72), and the movement regulating portion 28 may also be formed in the door inner panel 15 or a member (e.g., a reinforcement) fixed to the door inner panel 15.

The present disclosure may also be applied to a front door or a back door of a vehicle.

What is claimed is:

1. A structure for attaching a wire harness at a vehicle door, the structure comprising:
   a slit that is formed in a door panel of a vehicle door and extends along a predetermined direction;
   an introduction hole that is provided in the door panel so as to be connected to one end portion of the slit in a direction of extension of the slit;
   a wire harness;
   a tube that covers a peripheral surface of the wire harness; and
   a clip that is fixed to the tube and is elastically deformable, wherein:
   the clip includes:
     a first contact portion that is configured to move via the introduction hole from a side of one surface of the door panel to a side of another surface of the door panel and is configured to contact the another surface of the door panel,
     an insertion portion that is slidably inserted into the slit from the one end portion when the first contact portion contacts the another surface of the door panel, and
     a second contact portion that contacts the one surface of the door panel when the insertion portion has been inserted into the slit, and
   a distance, in a thickness direction of the door panel, between the first contact portion and the second contact portion when the clip is in a free state is smaller than a thickness of the door panel.

2. The structure for attaching a wire harness at a vehicle door of claim 1, wherein a linear portion formed in the second contact portion makes line contact with the one surface of the door panel.

3. The structure for attaching a wire harness at a vehicle door of claim 1, wherein the clip includes a pair of third contact portions that elastically deform and contact a pair of inner surfaces in a width direction of the slit when the insertion portion has been inserted into the slit.

4. The structure for attaching a wire harness at a vehicle door of claim 3, wherein a dimension of the third contact portions in the width direction gradually becomes larger from a side of another end portion of the slit to a side of the one end portion.

5. The structure for attaching a wire harness at a vehicle door of claim 1, wherein:
- the door panel includes a movement regulating portion that opposes the introduction hole from the side of the another surface of the door panel,
- a guide surface, which opposes an inner peripheral surface of the introduction hole in the predetermined direction when the first contact portion contacts a surface of the movement regulating portion that opposes the introduction hole, is formed in the first contact portion, and
- when the guide surface contacts the inner peripheral surface while moving in a direction from the side of the one end portion of the slit toward the side of the another end portion, the guide surface guides the first contact portion to a position at which the first contact portion opposes the another surface of the door panel.

6. The structure for attaching a wire harness at a vehicle door of claim 5, wherein the movement regulating portion includes a stopper surface that opposes the first contact portion in a direction parallel to the predetermined direction when the insertion portion has been inserted into the slit.

7. The structure for attaching a wire harness at a vehicle door of claim 1, wherein the slit slopes relative to a horizontal direction in such a way that the another end portion of the slit is positioned lower than the one end portion of the slit.

8. The structure for attaching a wire harness at a vehicle door of claim 1, wherein a tapered surface, which is connected to the one end portion of the slit and whose dimension in a width direction of the slit gradually becomes smaller toward the one end portion side, is formed at an inner peripheral surface of the introduction hole.

9. The structure for attaching a wire harness at a vehicle door of claim 1, further comprising a fixing member that fixes the tube to the door panel when the first contact portion has contacted the another surface of the door panel and the second contact portion has contacted the one surface of the door panel.

10. A method of attaching a wire harness at a vehicle door, the method comprising using an elastically deformable clip fixed to a tube that covers a peripheral surface of the wire harness to attach the wire harness to a door panel of the vehicle door, wherein:
- a slit that extends along a predetermined direction and an introduction hole that is connected to one end portion of the slit in a direction of extension of the slit are formed in the door panel,
- the clip includes a first contact portion, an insertion portion, and a second contact portion, and a distance, in a thickness direction of the door panel, between the first contact portion and the second contact portion when the clip is in a free state is smaller than a thickness of the door panel,
- the first contact portion is moved via the introduction hole from a side of one surface to a side of another surface of the door panel and brought into contact with the another surface of the door panel,
- when the first contact portion contacts the another surface of the door panel, the insertion portion is slidably inserted into the slit from the one end portion, and
- the second contact portion is brought into contact with the one surface of the door panel by inserting the insertion portion into the slit.

\* \* \* \* \*